United States Patent

(12) United States Patent
Damnjanovic et al.

(10) Patent No.: US 11,737,140 B2
(45) Date of Patent: Aug. 22, 2023

(54) LONG TERM SENSING FOR EXCEPTION TO MEDIUM ACCESS RESTRICTION

(71) Applicant: QUALCOMM INCORPORATED, San Diego, CA (US)

(72) Inventors: Aleksandar Damnjanovic, Del Mar, CA (US); Tao Luo, San Diego, CA (US); Arumugam Chendamarai Kannan, San Diego, CA (US); Vinay Chande, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 17/248,179

(22) Filed: Jan. 12, 2021

(65) Prior Publication Data

US 2021/0259016 A1    Aug. 19, 2021

Related U.S. Application Data

(60) Provisional application No. 62/976,337, filed on Feb. 13, 2020.

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0048* (2013.01); *H04W 16/14* (2013.01); *H04W 24/10* (2013.01); *H04W 72/1215* (2013.01)

(58) Field of Classification Search
None
See application file for complete search history.

(56) References Cited

U.S. PATENT DOCUMENTS

| 2002/0146983 | A1* | 10/2002 | Scherzer | H04W 16/28 455/67.11 |
| 2015/0264699 | A1* | 9/2015 | Fwu | H04L 5/0091 370/329 |

(Continued)

FOREIGN PATENT DOCUMENTS

EP    3082370 A1    10/2016

OTHER PUBLICATIONS

International Search Report and Written Opinion—PCT/US2021/013143—ISA/EPO—dated May 10, 2021.
(Continued)

*Primary Examiner* — Adnan Baig
(74) *Attorney, Agent, or Firm* — Haynes and Boone LLP

(57) ABSTRACT

Wireless communications systems and methods related to medium access in a shared radio frequency band with long-term sensing for exception to medium access restriction are provided. A wireless communication device performs channel measurements in a shared radio frequency band during a plurality of measurement occasions spaced apart in time, the performing the channel measurements being based on a plurality of spatial directions. The wireless communication device determines whether the channel measurements satisfy a criterion for accessing the shared radio frequency band without a medium access restriction. The wireless communication device transmits, in a first spatial direction, a first communication signal in the shared radio frequency band without the medium access restriction in response to determining that the channel measurements satisfy the criterion, the plurality of spatial directions including the first spatial direction.

28 Claims, 8 Drawing Sheets

(51) Int. Cl.
*H04W 72/12* (2023.01)
*H04W 24/10* (2009.01)
*H04W 16/14* (2009.01)

(56) References Cited

U.S. PATENT DOCUMENTS

| | | | |
|---|---|---|---|
| 2019/0014594 A1* | 1/2019 | Park | H04W 74/0808 |
| 2019/0081761 A1* | 3/2019 | Liu | H04L 5/005 |
| 2019/0104546 A1 | 4/2019 | Chendamarai Kannan et al. | |
| 2019/0253115 A1* | 8/2019 | Park | H04B 17/24 |
| 2020/0396012 A1* | 12/2020 | Liu | H04B 7/088 |
| 2021/0029653 A1* | 1/2021 | Zhang | H04W 52/367 |
| 2021/0392683 A1* | 12/2021 | Awadin | H04B 7/088 |
| 2022/0131666 A1* | 4/2022 | Iwai | H04L 5/0007 |

OTHER PUBLICATIONS

Qualcomm Incorporated: "Gap Pattern Design for NR", 3GPP TSG-RAN WG4 RAN#84 Bis, 3GPP Draft, R4-1710176, 3rd Generation Partnership Project (3GPP), Mobile Competence Centre, 650, Route Des Lucioles, F-06921 Sophia-Antipolis Cedex, France, vol. RAN WG4, No. Dubrovnik, Croatia, Oct. 9, 2017-Oct. 13, 2017, pp. 1-3, Oct. 8, 2017 (Oct. 8, 2017), XP051345066, Retrieved from the Internet: URL: http://www.3gpp.orgjftp/Meetings_3GPP_SYNC/RAN4/Docs/ [retrieved on Oct. 8, 2017] Measurement time; p. 1, paragraph 2.1.

* cited by examiner

ID
LONG TERM SENSING FOR EXCEPTION TO MEDIUM ACCESS RESTRICTION

CROSS REFERENCE TO RELATED APPLICATIONS

The present application claims priority to and the benefit of U.S. Provisional Patent Application No. 62/976,337, filed Feb. 13, 2020, which is hereby incorporated by reference in its entirety as if fully set forth below and for all applicable purposes.

TECHNICAL FIELD

This application relates to wireless communication systems, and more particularly to medium access in a shared radio frequency band (e.g., in a shared spectrum or an unlicensed spectrum) with long-term sensing for exception to medium access restriction.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a reservation signal (e.g., a preamble) to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes performing, by a wireless communication device, channel measurements in a shared radio frequency band during a plurality of measurement occasions spaced apart in time, the performing the channel measurements being based on a plurality of spatial directions; determining, by the wireless communication device, whether the channel measurements satisfy a criterion for accessing the shared radio frequency band without a medium access restriction; and transmitting, by the wireless communication device in a first spatial direction, a first communication signal in the shared radio frequency band without the medium access restriction in response to determining that the channel measurements satisfy the criterion, the plurality of spatial directions including the first spatial direction.

In an additional aspect of the disclosure, a wireless communication device includes a processor configured to perform channel measurements in a shared radio frequency band during a plurality of measurement occasions spaced apart in time, the channel measurements being based on a plurality of spatial directions; and determine whether the channel measurements satisfy a criterion for accessing the shared radio frequency band without a medium access restriction; and a transceiver coupled to the processor, where the transceiver is configured to transmit, in a first spatial direction, a first communication signal in the shared radio frequency band without the medium access restriction in response to determining that the channel measurements satisfy the criterion, the plurality of spatial directions including the first spatial direction.

In an additional aspect of the disclosure, a non-transitory computer-readable medium having program code recorded thereon, the program code includes code for causing a wireless communication device to perform channel measurements in a shared radio frequency band during a plurality of measurement occasions spaced apart in time, the channel measurements being based on a plurality of spatial directions; code for causing the wireless communication device to determine whether the channel measurements satisfy a criterion for accessing the shared radio frequency band without a medium access restriction; and code for causing the wireless communication device to transmit, in a first spatial direction, a first communication signal in the shared radio frequency band without the medium access restriction in response to determining that the channel measurements satisfy the criterion, the plurality of spatial directions including the first spatial direction.

In an additional aspect of the disclosure, a wireless communication device includes means for perform channel measurements in a shared radio frequency band during a plurality of measurement occasions spaced apart in time, the channel measurements being based on a plurality of spatial directions; means for determining whether the channel measurements satisfy a criterion for accessing the shared radio frequency band without a medium access restriction; and means for transmitting, in a first spatial direction, a first communication signal in the shared radio frequency band without the medium access restriction in response to determining that the channel measurements satisfy the criterion, the plurality of spatial directions including the first spatial direction.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
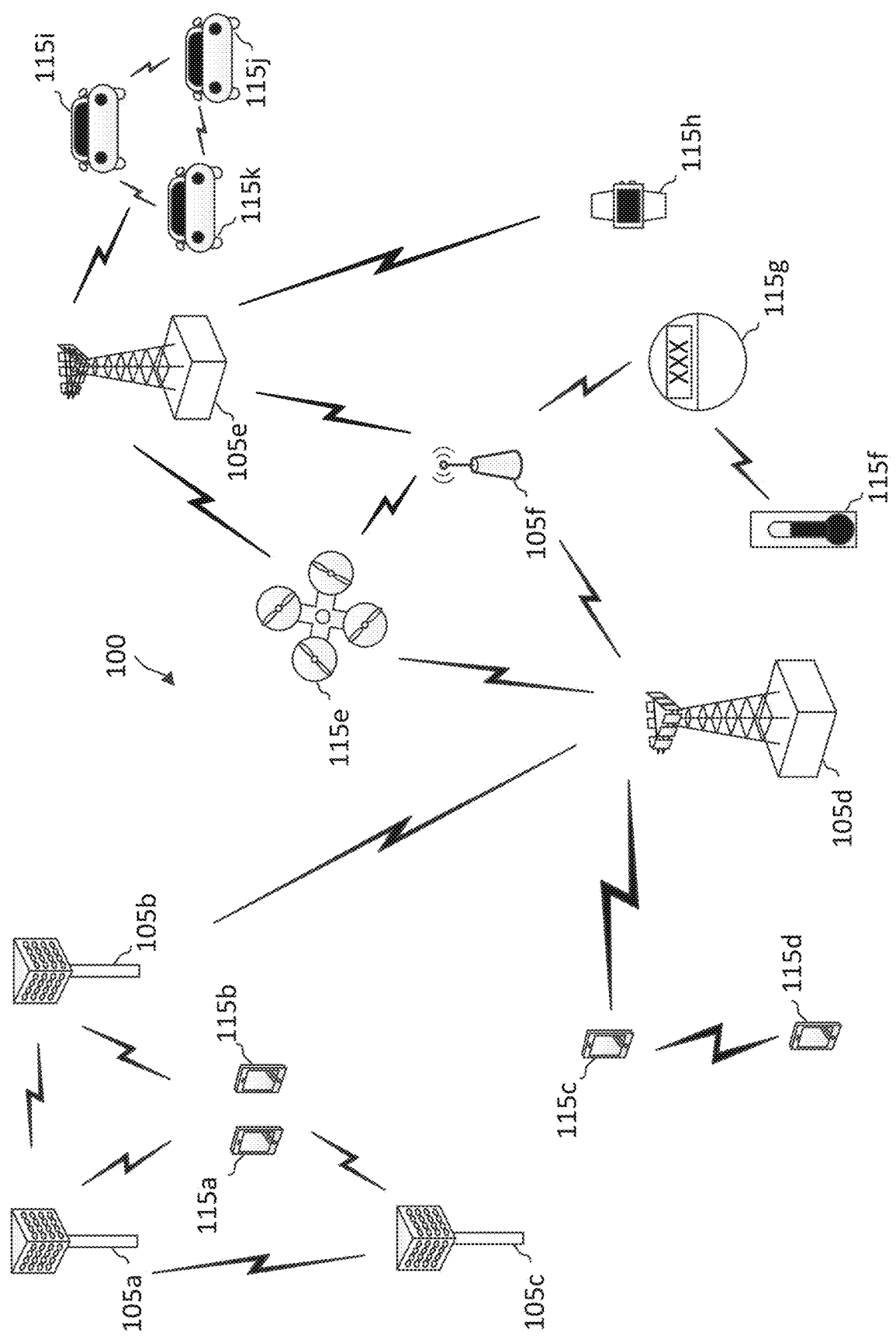
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, an LBT procedure may be used to assess whether a shared channel is clear before transmitting a signal in the channel During the initial phase of the LBT procedure, a device may perform a clear channel assessment (CCA) for a predetermined duration. During the CCA, the device may compare the energy level detected in the channel to a threshold value. If the energy level exceeds the threshold, the device may determine that the channel is occupied, refrain from transmitting a signal, and repeat the CCA after a period of time, or the device may reduce its transmit power to avoid interfering with other devices that may be using the channel. If the energy level is below the threshold, the device may determine that the channel is unoccupied and proceed with transmitting a signal.

While LBT can facilitate medium access in a shared channel, the LBT procedure may prove inefficient for medium access over a mmWave band. For instance, due to the high pathloss in a mmWave band, transmitters and receivers operating may utilize directional beams to communicate with each other. Since LBT measures energy in a channel and declare a channel occupancy based on the measured channel energy exceeding a threshold, there may be a poor correlation between a transmitter detecting energy in a channel and the transmitter's potential in interfering with a receiver of an ongoing communication link. For instance, the transmitter may intend to transmit in one direction and the receiver of the ongoing communication link may be receiving data from another direction. Thus, the transmitter can transmit without interfering with the receiver of the ongoing communication link. However, due to the detected channel energy, the transmitter may refrain from transmitting in the channel. Additionally, depending on the network deployment, the transmitter and the receiver, for example, of a base station (BS), may not be co-located, and thus the transmitter and the receiver can be pointing to different directions for corresponding transmissions and receptions, respectively. Thus, LBT may not be efficient for medium access over mmWave bands.

The present disclosure provides techniques for medium access in a shared radio frequency band, such as a mmWav band, with long-term sensing to determine whether a certain medium access restriction, such as an LBT, can be excluded. For instance, a wireless communication device, which may be a BS or a UE, may be configured, for example, by a network, with a plurality of measurement occasions spaced apart in time for long-term channel measurements. The wireless communication device may perform channel measurement in the shared radio frequency band during the plurality of measurement occasions. The channel measurements can be performed in a plurality of spatial directions. In some instances, the channel measurements can be omni-directional channel measurements (e.g., in all spatial directions). The wireless communication device may determine whether the channel measurements satisfy a criterion (e.g., a certain threshold) for accessing the shared radio frequency band without a medium access restriction. The medium access restriction may be part of a regulation for accessing the shared radio frequency band. In some aspects, the medium access restriction may limit a certain transmission characteristic, such as a transmission beam width, a transmit power, a transmit PSD, a transmission duty cycle, and/or a utilization of an LBT prior to a transmission.

If the long-term channel measurements satisfy the criterion for accessing the shared radio frequency band without the medium access restriction, the wireless communication device may transmit a communication signal in the shared radio frequency band without the medium access restriction. The communication signal can be transmitted in a first spatial direction of the plurality of spatial directions. The wireless communication device may access the shared radio frequency band based on a medium access protocol as defined by a radio access technology (RAT) in use.

If the long-term channel measurements fail to satisfy the criterion for accessing the shared radio frequency band without the medium access restriction, the wireless communication device may transmit a communication signal in the shared radio frequency band with the medium access restriction.

In some aspects, all cooperating wireless communication device operating under a certain RAT may be configured with the measurement occasions and may perform channel measurements during the measurement occasions. The cooperating devices may remain silence (with no transmission) during the measurement occasions so that each cooperating device may not interfere with each other's measurements. Since all cooperating devices stay silence during the measurement occasions, the cooperating devices may determine whether there is any non-cooperating node nearby based on whether the long-term channel measurements satisfy a certain threshold. When there is a non-cooperating device nearby, the cooperating devices may apply the medium access restriction. In other words, the medium access restriction can be applied for inter-RAT medium access, while intra-RAT medium access can be based on corresponding RAT-defined medium access protocols.

Aspects of the present disclosure can provide several benefits. For example, the use of long-term channel sensing can enable the application of a medium access restriction as needed, for example, when a nearby non-cooperating device is detected, instead of applying the medium access restriction for every transmission. For instance, the long-term channel sensing may allow a transmitting device to transmit without perform an LBT when there is no nearby non-cooperating device detected, and thus can avoid the LBT overheads. Alternatively, the long-term channel sensing may allow a transmitting device to transmit with unrestricted transmission parameters when there is no nearby non-cooperating device detected, and thus can provide for a higher quality transmission, for example, in terms of signal-to-noise ratio (SNR) and/or signal-interference-plus-noise ratio (SINR). Thus, the long-term channel sensing can provide a more efficient or more effective channel access. Accordingly, spectrum utilization efficiency can also be improved.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may operate over a mmWave band (e.g., at 60 GHz). Due to the high pathloss in the mmWave band, the BSs 105 and the UEs 115 may utilize directional beams to communicate with each other as shown in FIG. 2.

Figure 2:
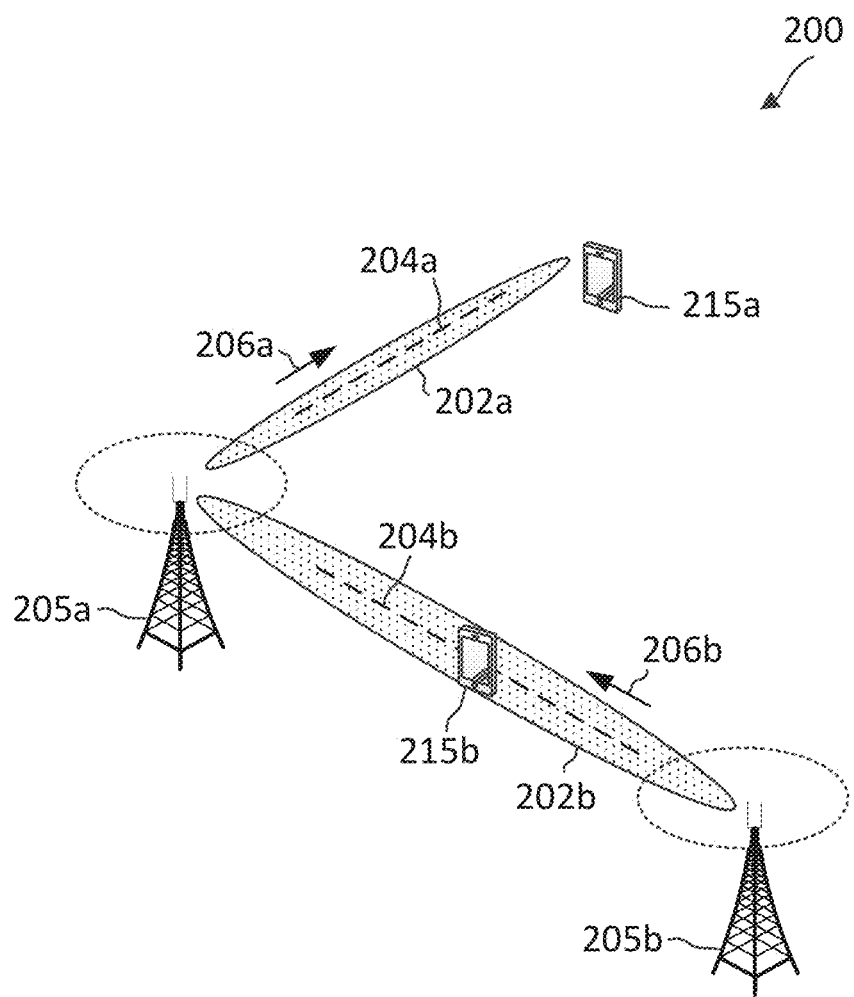
FIG. 2 illustrates a wireless communication network with directional transmitters and receivers according to some aspects of the present disclosure.

FIG. 2 illustrates a wireless communication network 200 with directional transmitters and receivers according to some aspects of the present disclosure. The network 200 may correspond to a portion of the network 100. FIG. 2 illustrates two BSs 205 (shown as 205a and 205b) and two UEs 215 (shown as 215a and 215b) for purposes of simplicity of discussion, though it will be recognized that aspects of the present disclosure may scale to any suitable number of UEs 215 (e.g., the about 3, 4, 3, 6, 7, 8, 9, 10, or more) and/or BSs 205 (e.g., the about 3, 4 or more). The BS 205 and the UEs 215 may be similar to the BSs 105 and the UEs 115, respectively. The BSs 205 and the UEs 215 may communicate over a mmWave band. The mmWave band may be at any mmWave frequencies (e.g., at 20 GHz, 30 GHz, 60 GHz or higher).

In the network 200, the BS 205a may serve the UE 215a, and the BS 205b may serve the UE 215b. In some aspects, the BS 205a and the UE 215a may be operated by one network operating entity, and the BS 205b and the UE 215b may be operated by a different network operating. In some aspects, the BS 205a and the UE 215a may communicate with each other using a one RAT, and the BS 205b and the UE 215b may communicate with each other using a different RAT. For instance, the BS 205a and the UE 215a may be WiFi devices, and the BS 205b and the UE 215b may be NR-U devices. NR-U may refer to the deployment of NR over an unlicensed spectrum.

In the illustrated example of FIG. 2, the BS 205a may transmit a transmission to the UE 215a using a transmission beam 202a in a direction 206a along a line-of-sight (LOS) path 204a. For instance, the BS 205a may generate the directional transmission beam 202a using digital beamforming and/or analog beamforming. The BS 205b may transmit a transmission to the UE 215b using a transmission beam 202b in a different direction 206b along a LOS path 204b. Similarly, the BS 205b may generate the directional transmission beam 202b using digital beamforming and/or analog beamforming.

As can be seen, the BS 205a is along the LOS path 204b where the BS 205b transmits a transmission to the UE 215b.

As such, if the BS 205a performs an LBT while the BS 205b is actively transmitting to the UE 215b using the transmission beam 202b, the BS 205a may detect a channel energy exceeding a certain LBT threshold, and thus the BS 205a may determine that the LBT fails and refrain from accessing the channel. However, the BS 205a may intend to transmit to the UE 215a in the direction 206a, which is different than the direction 206b. Since the transmission is highly directional, the BS 205a can proceed with the transmission to the UE 215a using the transmission beam 202a without interfering with the UE 215b's reception from the BS 205b. As such, the packet-by-packet, energy detection-based LBT may be ineffective for medium access in mmWave band.

Accordingly, the present disclosure provides techniques for medium access over a shared radio frequency band (e.g., a mmWave band) with long-term sensing to determining whether a certain medium access restriction can be excluded. The medium access restriction can include a restriction on a certain transmission characteristic (e.g., a maximum beam width, a maximum transmit power, a maximum transmit PSD, a maximum duty cycle) and/or the inclusion of an LBT procedure.

Figure 3:
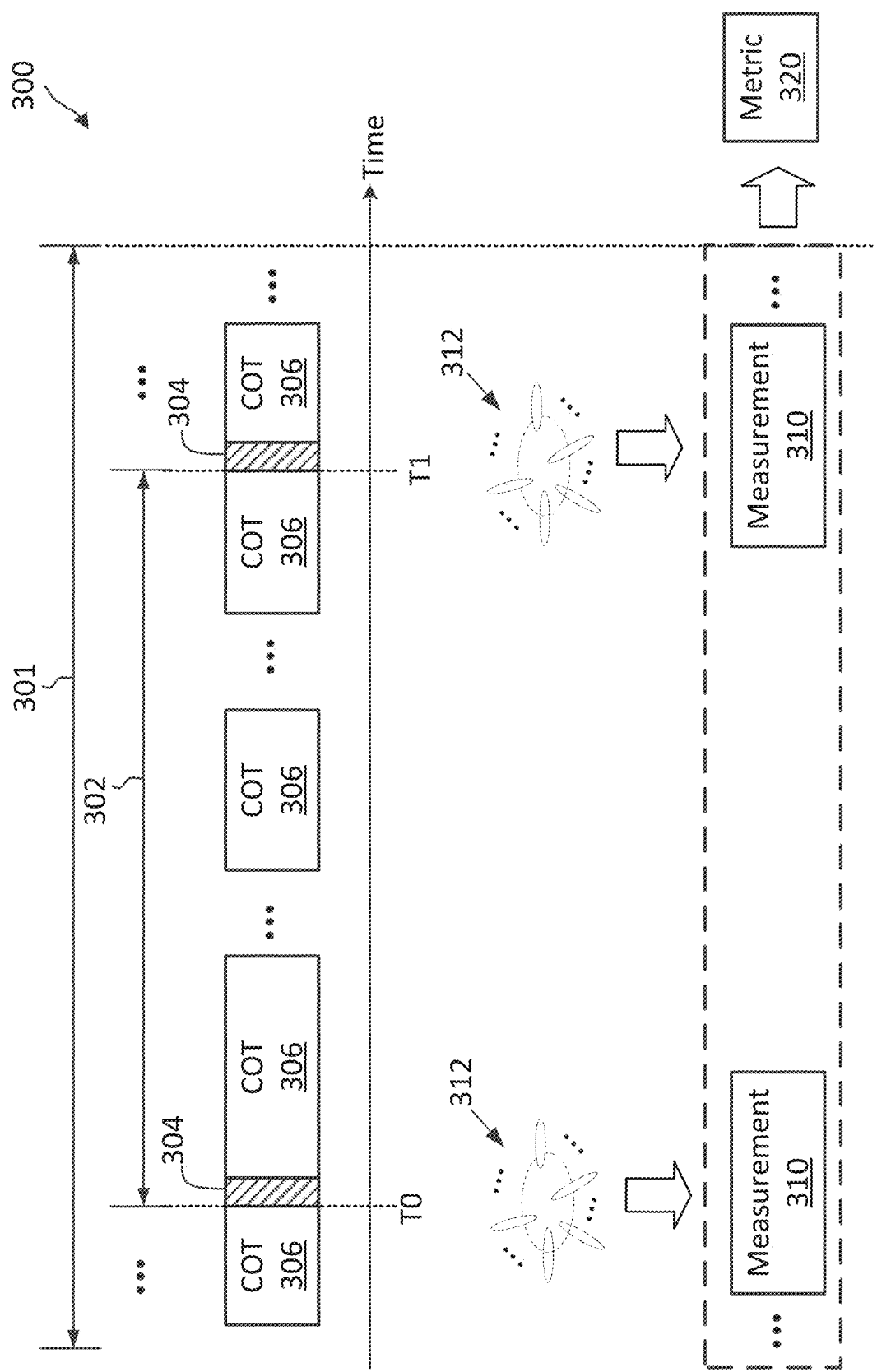
FIG. 3 illustrates a medium access scheme with long-term sensing according to some aspects of the present disclosure.

FIG. 3 illustrates a medium access scheme 300 with long-term sensing according to some aspects of the present disclosure. In FIG. 3, the x-axis represents time in some arbitrary units. The scheme 300 may be employed by wireless communication devices such as the BSs 105 and 205 and the UEs 115 and 215 in a network such as the networks 100 and 200. In particular, wireless communication nodes or devices may employ the scheme 300 to perform medium access in a shared channel (e.g., a mmWav band at 10 GHz, 20 GHz, 30 GHz, 60 GHz) with long-term sensing as shown the scheme 300. At a high level, the devices may access the shared channel using a medium access protocol as defined by a RAT (e.g., WiFi, NR-U) in use by the devices and may utilize long-term channel sensing measurements to determine whether to apply a medium access restriction in addition to the medium access protocol.

In the scheme 300, devices (e.g., the BSs 105 and/or 205 and the UEs 115 and/or 215) are configured with measurement occasions 304 (e.g., at time T0 and T1). The measurement occasions 304 may be periodic, for example, repeating at a time interval 302. The repeating time interval 302 can have any suitable duration (e.g., about 1 milliseconds (ms), 10 ms, 20 ms, 50 ms, or 100 ms or more). Each device may perform channel measurements during the measurement occasions 304. For instance, during each measurement occasion 304, the device may measure the channel energy (e.g., measurement 310) in the shared channel. For example, the device may compute a received signal power at each measurement occasion 304. The device may configure a frontend (e.g., the RF unit 514 of FIG. 5 or the RF unit 614 of FIG. 6) and/or a transceiver (e.g., the transceiver 510 of FIG. 5 or the transceiver 610 of FIG. 6) at the device to receive signals from one or more spatial directions via analog and/or digital beamforming. In some aspects, the device may measure the channel energy in all spatial directions as shown by reference numerals 312. The device may collect statistics related to the channel measurements 310 over a long-term period 301. The long-term period 301 may have any suitable duration (e.g., 0.1 second, 1 second, 2 seconds, 10 seconds, 60 secs or more). In some aspects, the long-term period 301 may include multiple measurement occasions 304 (e.g., 5, 10, 20, or 30 or more). The device may determine a metric 320 from the measurements 310 collected over the long-term period 301. The device may determine whether the metric 320 satisfies one or more criteria for accessing the channel without a medium access restriction. For instance, if the metric 320 is below a certain threshold, the device may access the channel without a certain medium access restriction. In other words, a medium access restriction can include an energy detection threshold. If the metric 320 is above a certain threshold, the device applies the medium access restriction when accessing the channel. The metric 320 may be a certain statistical metric over the measurements 310 obtained during the long-term period 301. For instance, the metric 320 can be an average channel energy measurement, a maximum channel energy measurement, a percentage of measurements above a threshold, a number of consecutive measurements above a threshold, and/or a variance of the measurements 310 the long-term period 301.

In some aspects, the criteria for accessing the channel without the medium access restriction may include having the most recent N channel measurements 310 (in the most recent N consecutive measurement occasions 304) being below a certain threshold. For instance, a device may access the channel without the medium access restriction when each measurement 310 in the most recent N channel measurements 310 is below the threshold. On the other hand, if any of the most recent N channel measurement 310 is above the threshold, the device may apply the medium access restriction for channel access. N can be any suitable integer number and may vary depending on the periodicity of the measurement occasions 304. For instance, N can be 5, 10, 20, 30, 50, or more. The threshold for determining whether to apply the medium access restriction can be predetermined. In some other aspects, the criteria for accessing for accessing the channel without the medium access restriction may be based on M measurements out of the last K measurements (e.g., in the most recent K measurement occasions 304) satisfying a certain criterion (e.g., a certain threshold), where M and K are integers. For instance, M can be 1, 2, 3, 4, 5 or more and N can be 5, 10, 20, 30, 50, or more. In some aspects, the criterion and/or threshold can be determined by the RAT that is in use by the device. In some aspects, the criterion and/or threshold can be flexible or configurable (e.g., by the network or a BS and can be based on network load and/or channel conditions). In some aspects, the criterion and/or threshold can be determined by a regulation that regulates medium access in the frequency band. In some aspects, the medium access restriction may also regulated by the regulation. The medium access restriction may restrict a certain transmission characteristic (e.g., a beam width, a transmit power, a transmit PSD, a duty cycle) and/or the requirement of an LBT prior to a transmission as will be discussed further below in FIG. 4B.

In some aspects, all cooperating devices, for example, operating under a certain RAT, may be configured by the network, with the measurement occasions 304. Thus, all cooperating devices may remain silent (e.g., no transmissions) during the measurement occasions 304. This can allow other cooperating devices to perform channel measurements without interference from another cooperating device. The cooperating device may also perform channel measurements during the measurement occasions for determining the long-term sensing metric 320. If there is a non-cooperating device, which may be a BS 105 or 205 or a UE 115 or 215, nearby in the network, the non-cooperating device may transmit at some point of time. As such, a cooperating device may detect the presence of a non-cooperating device through the measurements 310, for example, one or more measurements 310 over the long-term period 301 may exceed the threshold. Accordingly, a cooperating device may detect whether there is any non-cooperating node nearby based on the long-term sensing measurements 310 and/or long-term sensing metric 320.

In the illustrated example of FIG. 3, the network may be an isolated deployment. In other words, all devices in the network may be cooperating devices. The isolated deployment may be common in a mmWav network since mmWave communications may have a shorter range or reach, and thus can create multiple localized deployments within a certain geographical area. Accordingly, each device may have a long-term sensing metric 320 satisfying the criteria for accessing the channel without the additional medium access restriction.

In some aspects, the cooperating devices may access or share the shared channel based on a medium access procedure or protocol as defined by the RAT in use. For instance, a cooperating device (e.g., a BS 105 or 205 or a UE 115 or 215) may win one or more COTs 306 in the shared channel based on the RAT-defined medium access protocol and may communicate (e.g., a PDSCH signal, PDCCH signal, a PUSCH signal, and/or a PUCCH signal) with one or more other cooperating devices during the COTs 306. In some aspects, the RAT-defined medium access protocol may utilize a synchronous access scheme (e.g., a frame-based equipment (FBE) scheme) or an asynchronous access scheme (e.g., a load-based equipment (LBE) scheme). In some aspects, the RAT-defined medium access protocol may utilize an energy detection-based contention scheme or a signal detection-based contention scheme. The medium access protocol may utilize various reservation signal (e.g., a predetermined preamble sequence, a request-to-send (RTS), a clear-to-send (CTS), a CTS-self, and/or a COT indication signal) exchanges for contention resolution. In some aspects, the RAT-defined medium access protocol may define certain contention parameters (e.g., a maximum occupancy time and/or a contention window size). In some aspects, the RAT-defined medium access protocol may include interference management, for example, restricting certain transmission parameters among the cooperating nodes sharing access in the channel.

Figure 4A:
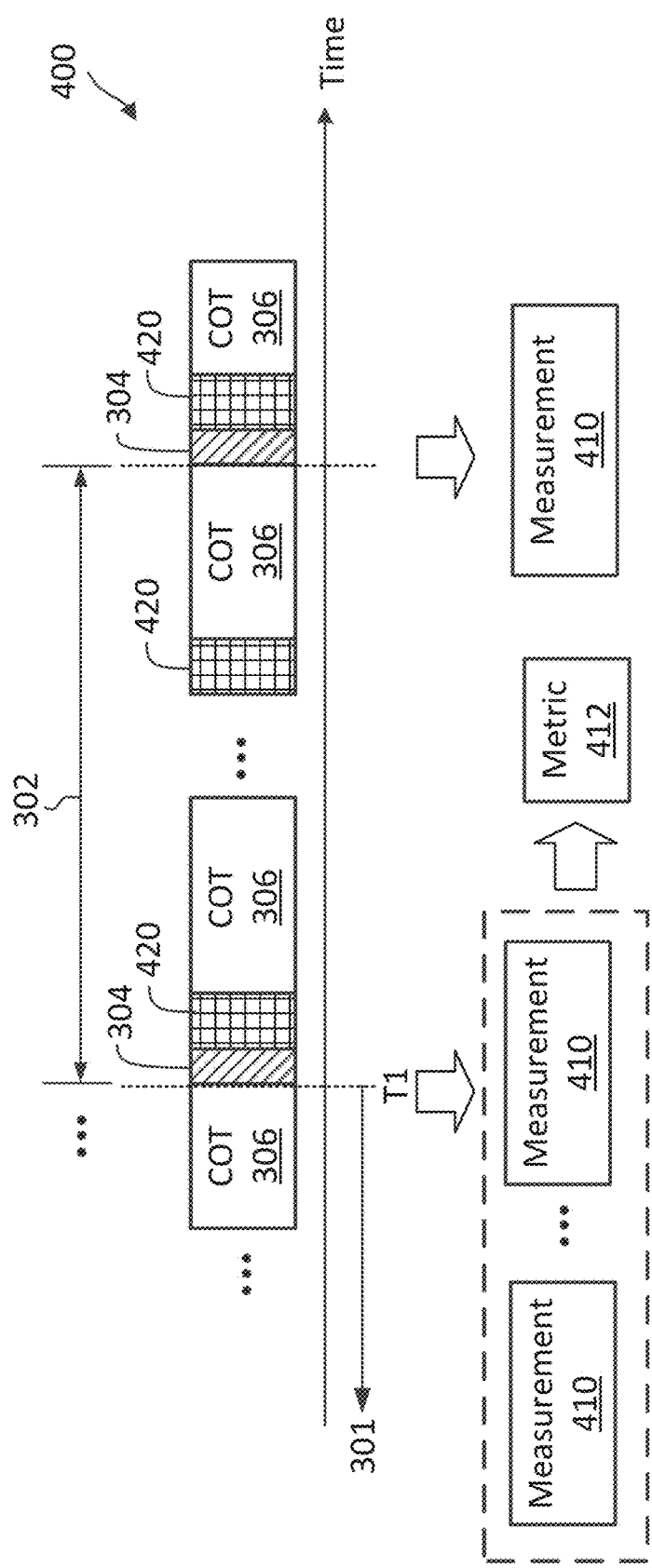
FIG. 4A illustrates a medium access scheme with long-term sensing according to some aspects of the present disclosure.
Figure 4B:
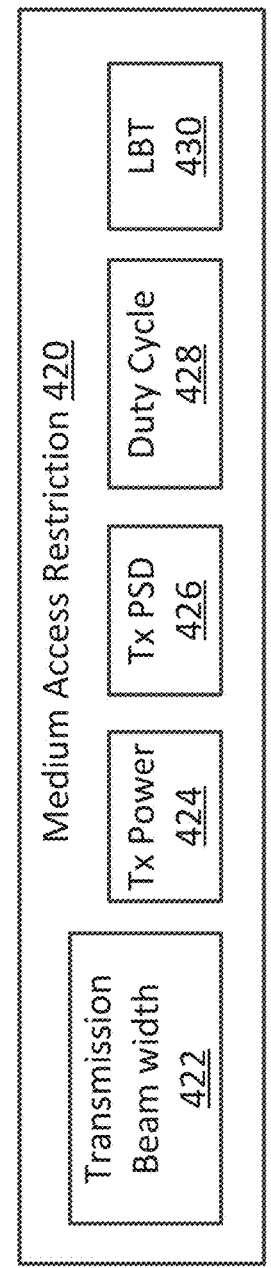
FIG. 4B illustrates a medium access restriction according to some aspects of the present disclosure.

FIG. 4A is discussed in relation to FIG. 4B to illustrate medium access with long-term sensing when the long-term sensing measurements fail to satisfy one or more criteria for access without a medium access restriction. FIG. 4A illustrates a medium access scheme 400 with long-term sensing according to some aspects of the present disclosure. In FIG. 4, the x-axis represents time in some arbitrary units. The scheme 400 may be employed by wireless communication devices such as the BSs 105 and 205 and the UEs 115 and 215 in a network such as the networks 100 and 200. In particular, wireless communication nodes or devices may employ the scheme 400 to perform medium access in a shared channel (e.g., a mmWav band at 10 GHz, 20 GHz, 30 GHz, 60 GHz) with long-term sensing as shown the scheme 400. The scheme 400 is substantially similar to the scheme 300 and provide a detailed view of medium access with a medium access restriction when the long-term sensing measurements fail to satisfy the one or more criteria for access without the medium access restriction. FIG. 4 may reuse the same reference numerals of FIG. 3 for simplicity's sake.

Similar to the scheme 300, a monitoring device (e.g., the BSs 105 and/or 205 and the UEs 115 and/or 215) may determine a channel measurement 410 during each measurement occasion 304 over a long-term period 301. The channel measurements 410 may be measured over various spatial directions (e.g., all directions as shown by 312 of FIG. 3). The monitoring device may determine a long-term sensing metric 412 from the channel measurements 410 collected over the long-term period 301, for example, using similar mechanisms as discussed above in the scheme 300 with reference to FIG. 3. In the illustrated example of FIG. 4, there may be other non-cooperating devices (e.g., of another RAT or the same RAT) nearby transmitting in the network. Thus, the long-term sensing metric 412 may exceed a certain threshold for accessing the channel without the medium access restriction. For instance, at time T1, the monitoring device may detect one or more channel measurements 410 in the most recent N measurements exceeding the threshold. As such, the monitoring device is aware that it is not operating in an isolated deployment. Accordingly, the monitoring device may access the channel by applying the additional medium access restriction, which may be regulated by a regulation. Alternatively, at time T1, the monitoring device may detect that M measurements out of K measurements fail to satisfy a certain criterion (e.g., a certain threshold).

As shown, when the monitoring device accesses the channel to acquire a COT 306, the monitoring device may apply a medium access restriction 420. For instance, the medium access restriction 420 may include an LBT as shown in FIG. 4B. While FIG. 4 illustrates the application of the medium access restriction 420 at the beginning when a COT 306 is acquired, the medium access restriction 420 can be applied to a transmission within the COT 306. For instance, the medium access restriction 420 may include a restriction on one or more transmission parameters as shown in FIG. 4B.

FIG. 4B illustrates the medium access restriction 420 according to some aspects of the present disclosure. The medium access restriction 420 may be employed by wireless communication devices such as the BSs 105 and 205 and the UEs 115 and 215 in a network such as the networks 100 and 200, for example, when long-term sensing measurements 410 fail a certain condition for accessing the channel without a medium access restriction as discussed above in FIGS. 3 and 4.

The medium access restriction 420 may include one or more of a transmission beam width restriction 422, a transmit (Tx) power restriction 424, a transmit (Tx) PSD restriction 426, a transmission duty cycle restriction 428, or an LBT procedure 430. The transmission beam width restriction 422 may include a beam width threshold. For instance, a device accessing the channel with the medium access restriction 420 may transmit using a transmission beam (e.g., the transmission beams 202a and/or 202b) with a beam width that does not exceed the beam width threshold. In some instances, the beam width of a transmission beam may refer to the angle at the area where most of the power is radiated, which is the peak power. For instance, the device may have a certain preconfigured transmission data table related to transmission configuration parameters and corresponding generated beam width stored at a memory (e.g., the memory 504 of FIG. 5 or the memory 604 of FIG. 6). The device may select one or more transmission configuration parameters from the table such that a generated transmission beam may have a beam width satisfying the beam width threshold. In some instances, the beam width threshold may be a maximum instantaneous beam width threshold for limiting an instantaneous beam width of a transmission at each time instant. In some other instances, the beam width threshold may be a maximum average beam width threshold for limiting an average beam width over a transmission duration.

The transmit power restriction 424 may include a transmit power threshold. For instance, a device accessing the channel with the medium access restriction 420 may transmit using a transmit power that that does not exceed the transmit power threshold. For instance, the device may have a certain preconfigured transmission data table related to transmission configuration parameters and corresponding output transmit power at a memory (e.g., the memory 504 of FIG. 5 or the memory 604 of FIG. 6). The device may select one or more transmission configuration parameters from the table such that a generated transmission may have a transmit power satisfying the transmit power threshold. In some instances, the transmit power threshold may be a maximum instantaneous transmit power threshold for limiting an instantaneous transmit power of a transmission at each time instant. In some other instances, the transmit power threshold may be a maximum average transmit power for limiting an average transmit power over a transmission duration.

The transmit PSD restriction 426 may include a transmit PSD threshold. For instance, a device accessing the channel with the medium access restriction 420 may transmit using a transmit PSD greater that does not exceed the transmit PSD threshold. For instance, the device may determine a transmit power for a certain transmission signal bandwidth occupancy such that a generated transmission may have a transmit PSD satisfying the transmit PSD threshold. The device may select one or more transmission configuration parameters for the determined transmit power as discussed above.

The transmission duty cycle restriction 428 may include a duty cycle threshold. For instance, a device accessing the channel with the medium access restriction 420 may transmit based on a duty cycle that does not exceed the duty cycle threshold. For instance, the device may determine a transmission duration for a transmission and a transmission gap between transmissions such that the transmission duty cycle may satisfy the duty cycle threshold. In other words, the medium access restriction 420 may include a channel occupancy time (COT) limit once a device gain access to a channel.

The medium access restriction 420 with the LBT procedure 430 may restrict a device's access to the channel based on an LBT result. For instance, the device may perform an LBT procedure 430 in the channel to contend for a COT 306. The LBT procedure 430 can be a CAT2, CAT3, or CAT4 LBT. In some instances, the LBT procedure 430 can be an energy detection-based LBT. In other words, the medium access restriction 420 may include an LBT requirement (e.g., whether an LBT can be omitted prior to a transmission or the LBT mode for accessing a channel) and/or an energy detection threshold (EDT) to be used for LBT.

In some aspects, the medium access restriction 420 may include all of the restrictions 422-428 and the LBT procedure 430. In some aspects, the medium access restriction 420 may include the LBT procedure 430. In some aspects, the medium access restriction 420 may include one of the restrictions 422-428. In some aspects, the medium access restriction 420 may include two of the restrictions 422-428. In general, the medium access restriction 420 may include any suitable combination of the restrictions 422-428 and the LBT procedure 430 and may vary depending on the regulation that regulates the channel in use. In other words, in the scheme 400, a medium access restriction may refer to a certain LBT requirement (e.g., whether an LBT can be omitted prior to a transmission or the LBT mode for accessing a channel), a certain energy detection threshold (EDT) requirement to be used for LBT, a channel occupancy time (COT) limit once gaining access to a channel, or any combination thereof.

Figure 5:
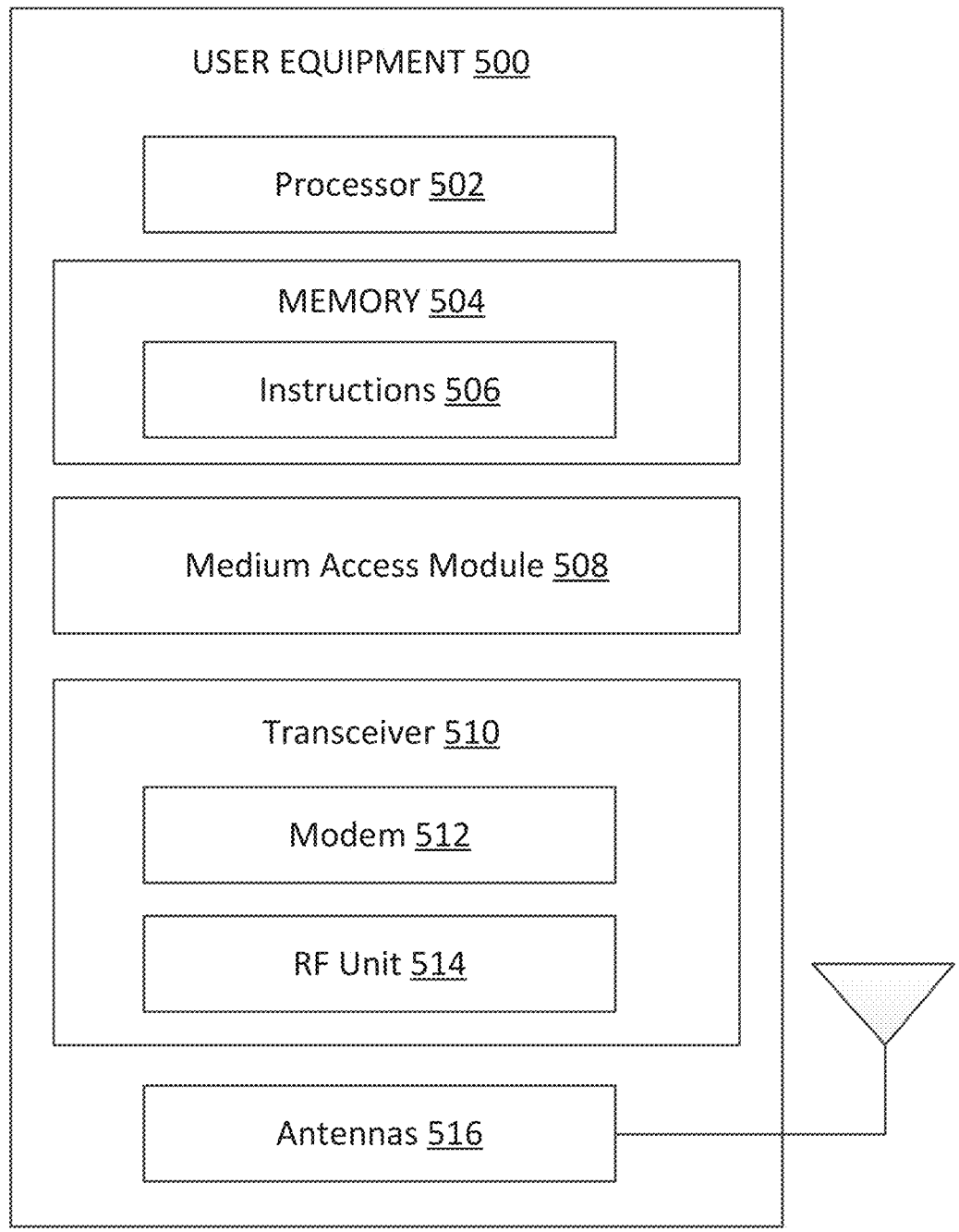
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a UE 215 discussed above in FIG. 2. As shown, the UE 500 may include a processor 502, a memory 504, a medium access module 508, a transceiver 510 including a modem subsystem 512 and a radio frequency (RF) unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-3, 4A-4B, and 7-8. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium access module 508 may be implemented via hardware, software, or combinations thereof. For example, the medium access module 508 may be implemented as a processor, circuit, and/or instructions 506 stored in the memory 504 and executed by the processor 502. In some instances, the medium access module 508 can be integrated within the modem subsystem 512. For example, the medium access module 508 can be implemented by a combination of software components (e.g., executed by a DSP or a general processor) and hardware components (e.g., logic gates and circuitry) within the modem subsystem 512.

The medium access module 508 may be used for various aspects of the present disclosure, for example, aspects of FIGS. 1-3, 4A-4B and 7-8. For instance, the medium access module 508 is configured to receive, for example, from a BS such as the BSs 105 and/or 205, a measurement configuration indicating a plurality of measurement occasions spaced apart in time, perform channel measurements during the plurality of measurement occasions in a shared radio frequency band, determine whether the channel measurements satisfy a criterion (e.g., a certain threshold) for accessing the shared radio frequency band without a medium access restriction. In some aspects, the medium access module 508 may perform the channel measurements in all spatial directions. In some aspects, the medium access restriction may be part of a regulation for accessing the shared radio frequency band. In some aspects, the medium access restriction may limit a certain transmission characteristic, such as a transmission beam width, a transmit power, a transmit PSD, and/or a transmission duty cycle, and/or a utilization of an LBT prior to a transmission.

In some aspects, the medium access module 508 is configured to transmit a communication signal in the shared radio frequency band without the medium access restriction in response to determining that the channel measurements satisfy the criterion for accessing the shared radio frequency band without the medium access restriction. In some aspects, the medium access module 508 may access the shared radio frequency band based on a medium access protocol as defined by a radio access technology (RAT) in use.

In some aspects, the medium access module 508 is configured to transmit a communication signal in the shared radio frequency band with the medium access restriction in response to determining that the channel measurements fail to satisfy the criterion for accessing the shared radio frequency band without the medium access restriction. In some aspects, the medium access module 508 may configure the transceiver 510 to transmit the first communication signal using a transmission bean with a beam width satisfying a beam width threshold based on the medium access restriction. In some aspects, the medium access module 508 may configure the transceiver 510 to transmit the first communication signal using a transmit power satisfying a transmit power threshold based on the medium access restriction. In some aspects, the medium access module 508 may configure the transceiver 510 to transmit the first communication signal with a transmit PSD satisfying a transmit PSD threshold based on the medium access restriction. In some aspects, the medium access module 508 may configure the transceiver 510 to transmit the first communication signa with a transmission duration satisfying a duty cycle threshold based on the medium access restriction. In some aspects, the medium access module 508 may configure the transceiver 510 to perform an LBT before transmitting the first communication signal based on the medium access restriction. In some aspects, the medium access module 508 may configure the transceiver 510 such that one or more of the beam width threshold, the transmit power threshold, the transmit PSD threshold, the transmission duty cycle threshold, and/or the utilization of the LBT are satisfied for the transmission of the first communication signal. Mechanisms for medium access with long-term channel sensing are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the medium access module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., PUSCH, PUCCH, channel reservation signals) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., RRC configuration, PDSCH, PDCCH, measurement configurations, channel reservation signals) to the medium access module 508 for processing. The antennas 516 may include multiple antennas of similar or different designs in order to sustain multiple transmission links. The RF unit 514 may configure the antennas 516.

In some aspects, the processor 502 is configured to coordinate with the medium access module 508 to perform channel measurements in a shared radio frequency band during a plurality of measurement occasions spaced apart in time and determine whether the channel measurements satisfy a criterion for accessing the shared radio frequency band without a medium access restriction. The channel measurements may be performed in all spatial directions. The transceiver 510 is coupled to the processor 502 and configured to coordinate with the medium access module 508 to transmit a first communication signal in the shared radio frequency band without the medium access restriction in response to determining that the channel measurements satisfy the criterion. The first communication signal may be transmitted in a first spatial direction of the plurality of spatial directions.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
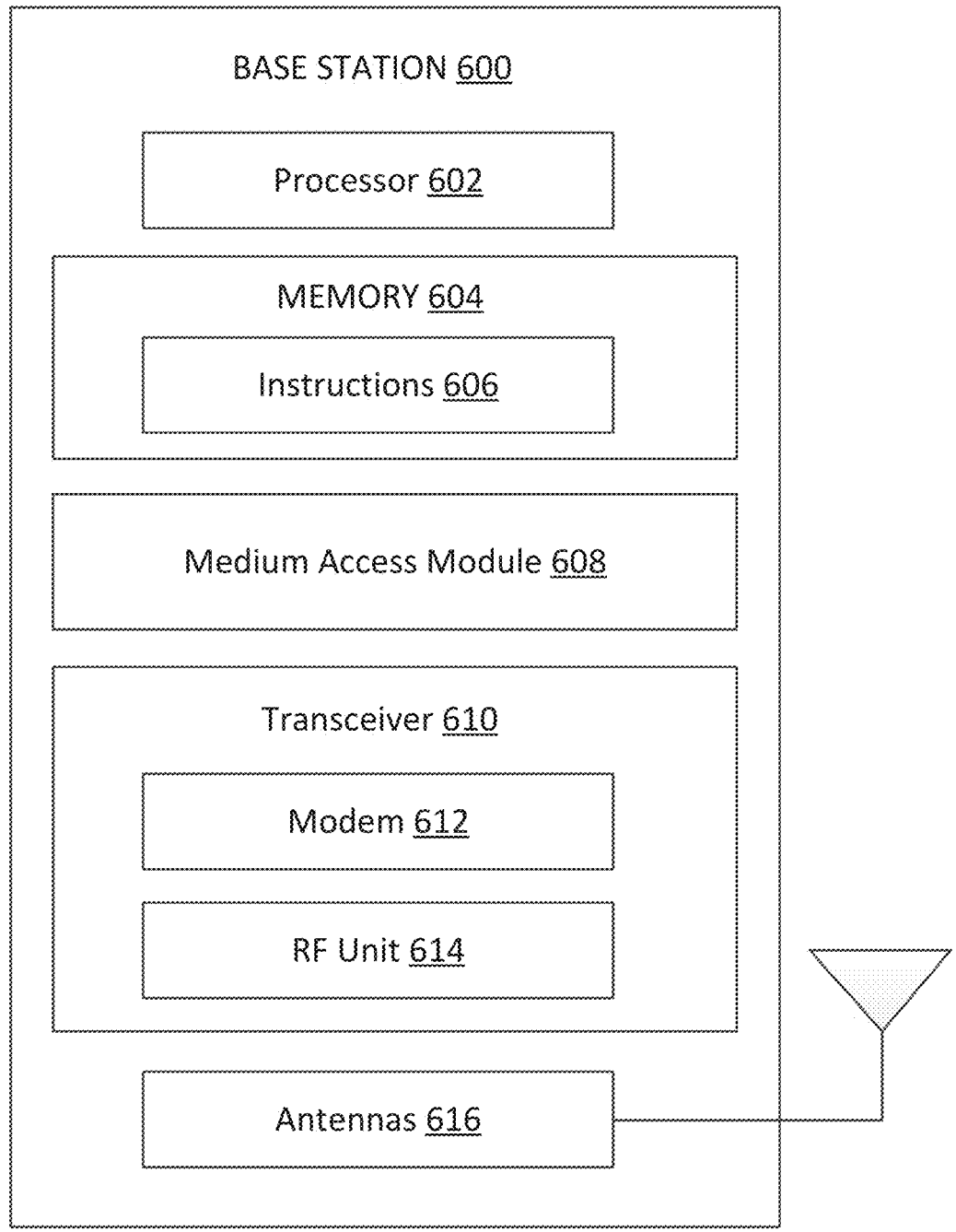
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, a medium access module 608, a transceiver 610 including a modem subsystem 612 and a RF unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-3, 4A-4B, and 7-8. Instructions 606 may also be referred to as code, which may be interpreted broadly to include any type of computer-readable statement(s) as discussed above with respect to FIG. 5.

The medium access module 608 may be implemented via hardware, software, or combinations thereof. For example, the medium access module 608 may be implemented as a processor, circuit, and/or instructions 606 stored in the memory 604 and executed by the processor 602. In some instances, the medium access module 608 can be integrated within the modem subsystem 612. For example, the medium access module 608 can be implemented by a combination of software components (e.g., executed by a DSP or a general processor) and hardware components (e.g., logic gates and circuitry) within the modem subsystem 612.

The medium access module 608 may be used for various aspects of the present disclosure, for example, aspects of FIGS. 1-3, 4A-4B, and 7-8. For instance, the medium access module 508 is configured to determine a plurality of measurement occasion spaced apart in time, perform channel measurement during the plurality of measurement occasions in a shared radio frequency band, transmit, for example, to a UE such as the UEs 115, 215, and/or 500, a measurement configuration indicating the plurality of measurement occasions, determine whether the channel measurements satisfy a criterion (e.g., a certain threshold) for accessing the shared radio frequency band without a medium access restriction. In some aspects, the medium access module 508 may perform the channel measurements in all spatial directions. In some aspects, the medium access restriction may be part of a regulation for accessing the shared radio frequency band. In some aspects, the medium access restriction may limit a certain transmission characteristic, such as a transmission beam width, a transmit power, a transmit PSD, a transmission duty cycle, and/or a utilization of an LBT prior to a transmission.

In some aspects, the medium access module 608 is configured to transmit a communication signal in the shared radio frequency band without the medium access restriction in response to determining that the channel measurements satisfy the criterion for accessing the shared radio frequency band without the medium access restriction. In some aspects, the medium access module 608 may access the shared radio frequency band based on a medium access protocol as defined by a radio access technology (RAT) in use.

In some aspects, the medium access module 608 is configured to transmit a communication signal in the shared radio frequency band with the medium access restriction in response to determining that the channel measurements fail to satisfy the criterion for accessing the shared radio frequency band without the medium access restriction. In some aspects, the medium access module 608 may configure the transceiver 610 to transmit the first communication signal using a transmission bean with a beam width satisfying a beam width threshold based on the medium access restriction. In some aspects, the medium access module 608 may configure the transceiver 610 to transmit the first communication signa using a transmit power satisfying a transmit power threshold based on the medium access restriction. In some aspects, the medium access module 608 may configure the transceiver 610 to transmit the first communication signal with a transmit PSD satisfying a transmit PSD threshold based on the medium access restriction. In some aspects, the medium access module 608 may configure the transceiver 610 to transmit the first communication signa with a transmission duration satisfying a duty cycle threshold based on the medium access restriction. In some aspects, the medium access module 608 may configure the transceiver 610 to perform an LBT before transmitting the first communication signal based on the medium access restriction. In some aspects, the medium access module 608 may configure the transceiver 610 such that one or more of the beam width threshold, the transmit power threshold, the transmit PSD threshold, the transmission duty cycle threshold, and/or the utilization of the LBT are satisfied for the transmission of the first communication signal. Mechanisms for medium access with long-term channel sensing are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., RRC configuration, PDSCH, PDCCH, measurement configurations, channel reservation signals) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., PUSCH, PUCCH, channel reservation signals) to the medium access module 608 for processing. The antennas 616 may include multiple antennas of similar or different designs in order to sustain multiple transmission links.

In some aspects, the processor 602 is configured to coordinate with the medium access module 608 to perform channel measurements in a shared radio frequency band during a plurality of measurement occasions spaced apart in time and determine whether the channel measurements satisfy a criterion for accessing the shared radio frequency band without a medium access restriction. The channel measurements may be performed in all spatial directions. The transceiver 610 is coupled to the processor 602 and configured to coordinate with the medium access module 608 to transmit a first communication signal in the shared radio frequency band without the medium access restriction in response to determining that the channel measurements satisfy the criterion. The first communication signal may be transmitted in a first spatial direction of the plurality of spatial directions.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
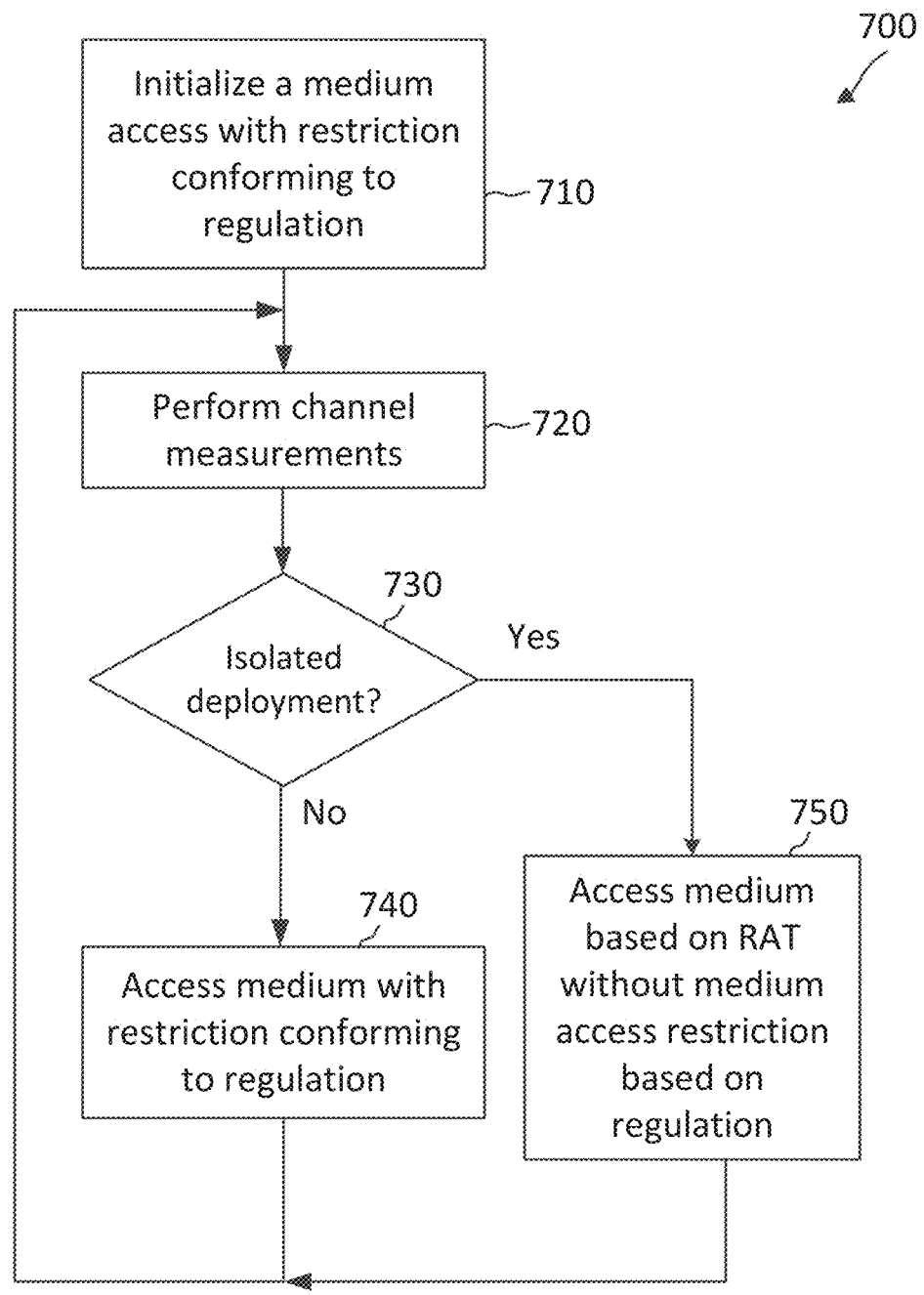
FIG. 7 is a flow diagram of a medium access method with long-term sensing according to some aspects of the present disclosure.

FIG. 7 is a flow diagram of a medium access method 700 with long-term sensing according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the medium access module 508, the transceiver 510, the modem 512, and the one or more antennas 516, to execute the steps of method 700. Alternatively, a wireless communication device, such as the BSs 105, 205, and/or 600, may utilize one or more components, such as the processor 602, the memory 604, the medium access module 608, the transceiver 610, the modem 612, and the one or more antennas 616, to execute the steps of method 700. The method 700 may employ similar mechanisms as in the schemes 300 and 400 discussed above with respect to FIGS. 3 and 4A, respectively, the medium access restriction 420 discussed above with reference to FIG. 4B. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a wireless communication device (e.g., a BS 105, 205, or 600 or a UE 115, 215, or 500) initializes a medium access procedure with a medium access restriction conforming to a regulation of a channel (e.g., in a mmWave band). In other words, the wireless communication device may begin with performing medium access in the channel conforming to the medium access restriction as defined by the regulation. The medium access restriction may be similar to the medium access restriction 420. For instance, the medium access restriction may restrict one or more of a transmission beam width (e.g., the beam width restriction 422), a transmit power (e.g., the transmit power restriction 424), a transmit PSD (e.g., the transmit PSD restriction 426), a transmission duty cycle (e.g., the transmission duty cycle restriction 428), and/or the utilization of an LBT (e.g., the LBT procedure 430) based on the regulation. In some instances, the wireless communication device may utilize one or more components, such as the processor 502 or 602, the medium access module 508 or 608, the transceiver 510 or 610, the modem 512 or 612, and/or the one or more antennas 516 or 616, to initialize the medium access procedure, for example, by configuring transmission parameters and/or an LBT procedure for accessing the channel according to the medium access restriction.

At block 720, the wireless communication device performs channel measurements in one or more spatial directions. For instance, the wireless communication device is configured with periodic measurement occasions (e.g., measurement occasions 304). The wireless communication device may determine a channel energy measurement (e.g., the channel measurements 310 and 410) at each measurement occasion. The wireless communication device may also determine a long-term sensing metric (e.g., the metrics 320 and/or 412). In some instances, the wireless communication device may utilize one or more components, such as the processor 502 or 602, the medium access module 508 or 608, the transceiver 510 or 610, the modem 512 or 612, and/or the one or more antennas 516 or 616, to perform channel measurements, for example, by receiving a signal from the channel at each measurement occasion, computing a received signal power of the received signal, saving a history of the received signal power at the memory, and determining the long-term sensing metric from the history of received signal power. In some instances, the channel measurements may be performed in spatial directions.

At block 730, the wireless communication device determines whether the wireless communication device is operating in an isolated deployment (e.g., with no non-cooperating nodes nearby). For instance, the wireless communication device may utilize one or more components, such as the processor 502 or 602, the medium access module 508 or 608, the transceiver 510 or 610, the modem 512 or 612, and/or the one or more antennas 516 or 616, to determine whether the long-term sensing metric satisfies a certain threshold. The wireless communication device may determine whether each measurement in the last N measurement measured in the measurement occasions satisfy the threshold. If the wireless communication device determines that all the N measurements are below the threshold, there are no non-cooperating node nearby, and thus the wireless communication device is operating in an isolated deployment and may proceed to block 750. In some other instances, the wireless communication device may determine whether the wireless communication device is operating in an isolated deployment based on whether M measurements out of the last K measurements measured in the measurement occasions satisfy a certain criterion (e.g., a certain threshold).

At block 750, the wireless communication device accesses the medium based on the RAT in use without the medium access restriction imposed by the regulation. For instance, the RAT may define a medium access protocol (e.g., utilizing a certain contention scheme and/or with contention parameters for intra-technology access) as discussed above with reference to FIG. 3. In some instances, the wireless communication device may utilize one or more components, such as the processor 502 or 602, the medium access module 508 or 608, the transceiver 510 or 610, the modem 512 or 612, and/or the one or more antennas 516 or 616, to perform medium access based on the RAT-defined medium access protocol. After performing the medium access, the wireless communication device may return to the block 720 and perform another channel measurement, for example, at a next measurement occasion. In some instances, the wireless communication device may win one or more COTs (e.g., the COTs 306) from the intra-technology contention. In some instances, the wireless communication device may not win any COT from the intra-technology contention.

Returning to block 730, if the wireless communication device determines that it is not operating in an isolated deployment (e.g., the long-term sensing metric fail to satisfy the threshold), the wireless communication device may proceed to block 740. At block 740, the wireless communication device accesses the medium with the medium access restriction of the regulation. The wireless communication device may apply the medium access restriction in addition to the RAT-defined medium access protocol. In some instances, the wireless communication device may utilize one or more components, such as the processor 502 or 602, the medium access module 508 or 608, the transceiver 510 or 610, the modem 512 or 612, and/or the one or more antennas 516 or 616, to perform medium access with the medium access restriction, for example, by configuring a transmission beam width to meet a beam width threshold, configuring a transmit power to meet a transmit power threshold, configuring a transmit PSD to meet a transmit PSD threshold, configuring a transmission duration and transmission gap to meet a duty cycle threshold, and/or perform an LBT prior to accessing the channel as defined by the regulation.

After performing the medium access, the wireless communication device may return to the block 720 and perform another channel measurement, for example, at a next measurement occasion. In some instances, the wireless communication device may win one or more COTs (e.g., the COTs 306) from the intra-technology contention and the inter-technology contention. In some instances, the wireless communication device may not win any COT from the intra-technology contention and the inter-technology contention.

The criteria on the long-term sensing of having each of the most recent N measurements and/or M out of K measurements meeting the threshold can allow the wireless communication device to quickly detect a non-isolated deployment (e.g., when there is a non-cooperating node of another deployment nearby), while the detection of an isolated deployment may take time (e.g., after 2, 3, 4, or more long-term period 301). Additionally, the rate at which a new node can be discovered may be determined by the periodicity or the repeating time interval (e.g., the time interval 302) of the measurement occasions.

Figure 8:
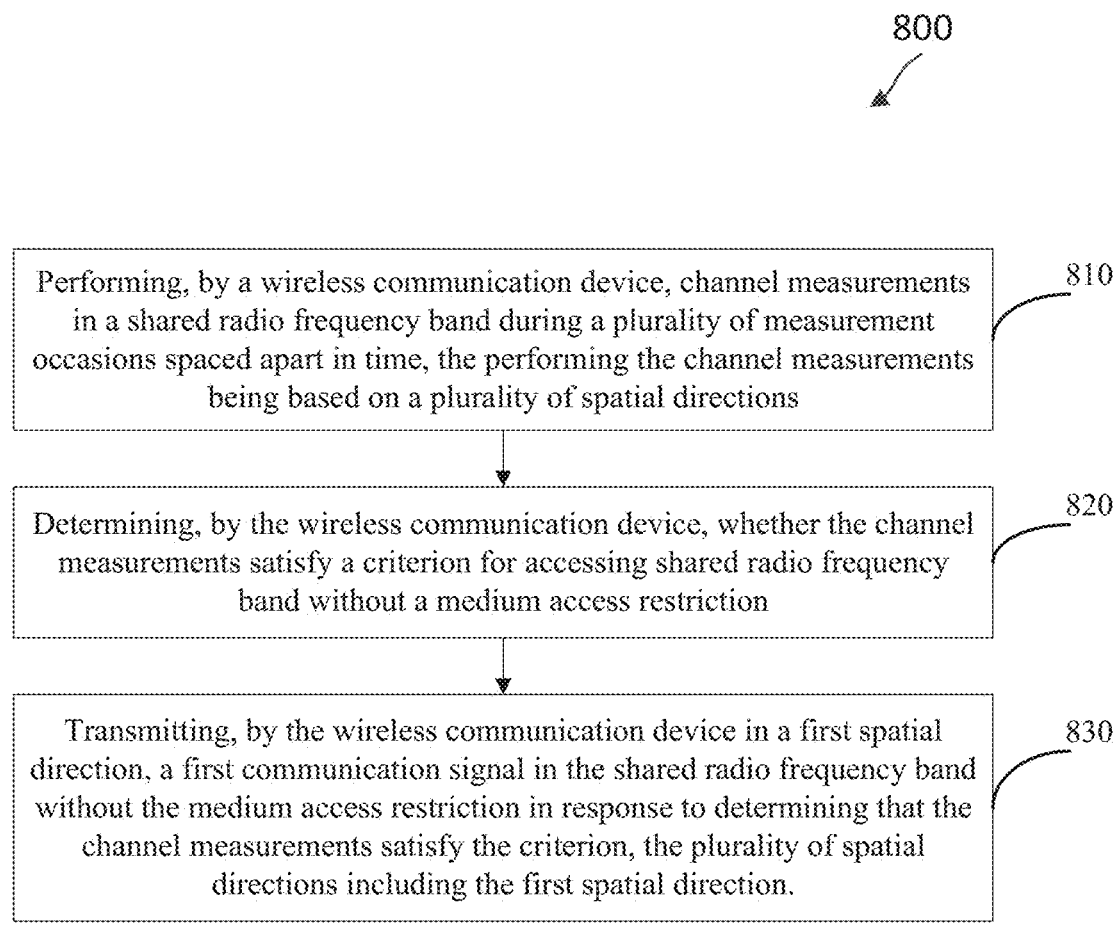
FIG. 8 is a flow diagram of a wireless communication method according to some aspects of the present disclosure.

FIG. 8 is a flow diagram of a wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the medium access module 508, the transceiver 510, the modem 512, and the one or more antennas 516, to execute the steps of method 800. Alternatively, a wireless communication device, such as the BSs 105, 205, and/or 600, may utilize one or more components, such as the processor 602, the memory 604, the medium access module 608, the transceiver 610, the modem 612, and the one or more antennas 616, to execute the steps of method 800. The method 800 may employ similar mechanisms as in the schemes 300 and 400 discussed above with respect to FIGS. 3 and 4A, respectively, the medium access restriction 420 discussed above with reference to FIG. 4B, and the method 700 as discussed above with reference to FIG. 7. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, a wireless communication device (e.g., a BS 105, 205, or 600 or a UE 115, 215, or 500) performs channel measurements in a shared radio frequency band (e.g., a mmWave band or a 60 GHz unlicensed band) during a plurality of measurement occasions (e.g., the measurement occasions 304) spaced apart in time. The performing the channel measurements is being based on a plurality of spatial directions. In some aspects, the performing the channel measurements can be being based on omni-directional channel measurements (e.g., including all spatial directions). In some instances, the wireless communication device may utilize one or more components, such as the processor 502 or 602, the medium access module 508 or 608, the transceiver 510 or 610, the modem 512 or 612, and/or the one or more antennas 516 or 616, to perform channel measurements, for example, by receiving a signal from the channel at each measurement occasion, computing a received signal power of the received signal, and saving a history of the received signal power at the memory.

At block 820, the wireless communication device determines whether the channel measurements satisfy a criterion for accessing the shared radio frequency band without a medium access restriction (e.g., the medium access restriction 420). In some aspects, a medium access restriction may refer to a certain LBT requirement (e.g., whether an LBT can be omitted prior to a transmission), a certain energy detection threshold (EDT) requirement to be used for LBT, a channel occupancy time (COT) limit once gaining access to a channel, or any combination thereof. In some instances, the wireless communication device may utilize one or more components, such as the processor 502 or 602, the medium access module 508 or 608, the transceiver 510 or 610, the modem 512 or 612, and/or the one or more antennas 516 or 616, to whether the channel measurements satisfy the criterion for accessing the shared radio frequency band without the medium access restriction.

In some aspects, the determining whether the channel measurements satisfy the criterion includes determining whether each measurement determined from a set of consecutive measurement occasions of the plurality of measurement occasions satisfy a threshold. In some aspects, the determining whether the channel measurements satisfy the criterion includes determining whether a predetermined number of channel measurements determined from a set of measurement occasions of the plurality of measurement occasions satisfies the criterion.

At block 830, the wireless communication device transmits, in a first spatial direction, a first communication signal in the shared radio frequency band without the medium access restriction in response to determining that the channel measurements satisfy the criterion, the plurality of spatial directions including the first spatial direction.

In some aspects, the medium access restriction includes a transmission beam width threshold (e.g., the beam width restriction 422), a transmit power threshold (e.g., the transmit power restriction 424), a transmit PSD threshold (e.g., the transmit PSD restriction 426), a transmission duty cycle threshold (e.g., the transmission duty cycle restriction 428), and/or an LBT procedure (e.g., the LBT procedure 430) as discussed above with reference to FIG. 4B.

In some aspects, the medium access restriction includes a beam width threshold (e.g., the beam width restriction 422), and the transmitting the first communication signal at block 830 includes transmitting the first communication signal using a transmission beam having a beam width without satisfying the beam width threshold.

In some aspects, the medium access restriction includes a transmit power threshold (e.g., the transmit power restriction 424), and the transmitting the first communication signal at block 830 includes transmitting the first communication signal using a transmit power without satisfying the transmit power threshold.

In some aspects, the medium access restriction includes a transmit PSD threshold (e.g., the transmit PSD restriction 426), and the transmitting the first communication signal at block 830 includes transmitting the first communication signal having a transmit PSD without satisfying the transmit PSD threshold.

In some aspects, the medium access restriction includes a duty cycle threshold (e.g., the transmission duty cycle restriction 428), and the transmitting the first communication signal at block 830 includes transmitting the first communication signal based on a duty cycle that is without satisfying the duty cycle threshold.

In some aspects, the medium access restriction includes an LBT (e.g., the LBT procedure 430), and the transmitting the first communication signal at block 830 includes transmitting the first communication signal without performing an LBT.

In some aspects, the wireless communication device may also perform second channel measurements in the shared radio frequency band during a second plurality of measurement occasions spaced apart in time. The performing the second channel measurements may be based on the plurality of spatial directions. The wireless communication device may also transmit, in a second spatial direction, a second communication signal in the shared radio frequency band with the medium access restriction in response to a determination that the second channel measurements fail to satisfy the criterion for accessing the shared radio frequency band without the medium access restriction. In some aspects, the transmitting the second communication signal may include using a transmission beam having a beam width satisfying a beam width threshold based on the medium access restriction. In some aspects, the transmitting the second communication signal may include using a transmit power satisfying a transmit power threshold based on the medium access restriction. In some aspects, the second communication signal may have a transmit PSD satisfying a transmit PSD threshold based on the medium access restriction. In some aspects, the transmitting the second communication signal may be based on a duty cycle satisfying a duty cycle threshold based on the medium access restriction. In some aspects, the transmitting the second communication signal may include performing an LBT before transmitting the second communication signal based on the medium access restriction.

Further aspects of the present disclosure include a method of wireless communication. The method of wireless communication includes performing, by a wireless communication device, channel measurements in a shared radio frequency band during a plurality of measurement occasions spaced apart in time, the performing the channel measurements being based on a plurality of spatial directions; determining, by the wireless communication device, whether the channel measurements satisfy a criterion for accessing the shared radio frequency band without a medium access restriction; and transmitting, by the wireless communication device in a first spatial direction, a first communication signal in the shared radio frequency band without the medium access restriction in response to determining that the channel measurements satisfy the criterion, the plurality of spatial directions including the first spatial direction.

The method may also include one or more of the following features. For instance, the method may include where the determining whether the channel measurements satisfy the criterion includes determining whether each measurement determined from a set of consecutive measurement occasions of the plurality of measurement occasions satisfies the criterion. The determining whether the channel measurements satisfy the criterion includes determining whether each measurement determined from the set of consecutive measurement occasions of the plurality of measurement occasions satisfies a threshold. The determining whether the channel measurements satisfy the criterion includes determining whether a predetermined number of channel measurements determined from a set of measurement occasions of the plurality of measurement occasions satisfies the criterion. The medium access restriction includes a beam width threshold, and where the transmitting the first communication signal includes transmitting, by the wireless communication device, the first communication signal using a transmission beam having a beam width without satisfying the beam width threshold. The medium access restriction includes a transmit power threshold, and where the transmitting the first communication signal includes transmitting, by the wireless communication device, the first communication signal using a transmit power without satisfying the transmit power threshold. The medium access restriction includes a transmit power spectral density (PSD) threshold, and where the transmitting the first communication signal includes transmitting, by the wireless communication device, the first communication signal having a transmit PSD without satisfying the transmit PSD threshold. The medium access restriction includes a duty cycle threshold, and where the transmitting the first communication signal includes transmitting, by the wireless communication device, the first communication signal based on a duty cycle that is without satisfying the duty cycle threshold. The medium access restriction includes a listen-before-talk (LBT), and where the transmitting the first communication signal includes transmitting the first communication signal without performing the LBT. The method may further include performing, by the wireless communication device, second channel measurements in the shared radio frequency band during a second plurality of measurement occasions spaced apart in time, the performing the second channel measurements being based on the plurality of spatial directions; and transmitting, by the wireless communication device in a second spatial direction, a second communication signal in the shared radio frequency band with the medium access restriction in response to a determination that the second channel measurements fail to satisfy the criterion for accessing the shared radio frequency band without the medium access restriction. The transmitting the second communication signal includes transmitting, by the wireless communication device, the second communication signal using a transmission beam having a beam width satisfying a beam width threshold based on the medium access restriction. The transmitting the second communication signal includes transmitting, by the wireless communication device, the second communication signal using a transmit power satisfying a transmit power threshold based on the medium access restriction. The transmitting the second communication signal includes transmitting, by the wireless communication device, the second communication signal having a transmit power spectral density (PSD) satisfying a transmit PSD threshold based on the medium access restriction. The transmitting the second communication signal includes transmitting, by the wireless communication device, the second communication signal based on a duty cycle satisfying a duty cycle threshold based on the medium access restriction. The transmitting the second communication signal includes performing, by the wireless communication device, a listen-before-talk (LBT) procedure before transmitting the second communication signal based on the medium access restriction. The shared radio frequency band is a millimeter wave (mmWav) unlicensed band.

Further aspects of the present disclosure include a wireless communication device. The wireless communication device includes a processor configured to perform channel measurements in a shared radio frequency band during a plurality of measurement occasions spaced apart in time, the channel measurements being based on a plurality of spatial directions; and determine whether the channel measurements satisfy a criterion for accessing the shared radio frequency band without a medium access restriction; and a transceiver configured to transmit, in a first spatial direction, a first communication signal in the shared radio frequency band without the medium access restriction in response to determining that the channel measurements satisfy the criterion, the plurality of spatial directions including the first spatial direction.

The wireless communication device may also include one or more of the following features. For instance, the wireless communication device may include where the processor configured to determine whether the channel measurements satisfy the criterion is further configured to determine whether each measurement determined from a set of consecutive measurement occasions of the plurality of measurement occasions satisfies the criterion. The processor configured to determine whether the channel measurements satisfy the criterion is further configured to determine whether each measurement determined from the set of consecutive measurement occasions of the plurality of measurement occasions satisfies a threshold. The processor configured to determine whether the channel measurements satisfy the criterion is further configured to determine whether a predetermined number of channel measurements determined from a set of measurement occasions of the plurality of measurement occasions satisfies the criterion. The medium access restriction includes a beam width threshold, and where the transceiver configured to transmit the first communication signal is further configured to transmit the first communication signal using a transmission beam having a beam width without satisfying the beam width threshold. The medium access restriction includes a transmit power threshold, and where the transceiver configured to transmit the first communication signal is further configured to transmit the first communication signal using a transmit power without satisfying the transmit power threshold. The medium access restriction includes a transmit power spectral density (PSD) threshold, and where the transceiver configured to transmit the first communication signal is further configured to transmit the first communication signal having a transmit PSD without satisfying the transmit PSD threshold. The medium access restriction includes a duty cycle threshold, and where the transceiver configured to transmit the first communication signal is further configured to transmit the first communication signal based on a duty cycle that is without satisfying the duty cycle threshold. The medium access restriction includes a listen-before-talk (LBT), and where the transceiver configured to transmit the first communication signal is further configured to transmit the first communication signal without performing the LBT. The processor is further configured to perform second channel measurements in the shared radio frequency band during a second plurality of measurement occasions spaced apart in time, the second channel measurements being based on the plurality of spatial directions; and the transceiver is further configured to transmit, in a second spatial direction, a second communication signal in the shared radio frequency band with the medium access restriction in response to a determination that the second channel measurements fail to satisfy the criterion for accessing the shared radio frequency band without the medium access restriction. The transceiver configured to transmit the second communication signal is further configured to transmit the second communication signal using a transmission beam having a beam width satisfying a beam width threshold based on the medium access restriction. The transceiver configured to transmit the second communication signal is further configured to transmit the second communication signal using a transmit power satisfying a transmit power threshold based on the medium access restriction. The transceiver configured to transmit the second communication signal is further configured to transmit the second communication signal having a transmit power spectral density (PSD) satisfying a transmit PSD threshold based on the medium access restriction. The transceiver configured to transmit the second communication signal is further configured to transmit the second communication signal based on a duty cycle satisfying a duty cycle threshold based on the medium access restriction. The processor is further configured to perform a listen-before-talk (LBT) procedure before the second communication signal based on the medium access restriction. The shared radio frequency band is a millimeter wave (mmWav) unlicensed band.

Further aspects of the present disclosure include a non-transitory computer-readable medium having program code recorded thereon. The non-transitory computer-readable medium includes code for causing a wireless communication device to perform channel measurements in a shared radio frequency band during a plurality of measurement occasions spaced apart in time, the channel measurements being based on a plurality of spatial directions. The medium also includes code for causing the wireless communication device to determine whether the channel measurements satisfy a criterion for accessing the shared radio frequency band without a medium access restriction. The medium also includes code for causing the wireless communication device to transmit, in a first spatial direction, a first communication signal in the shared radio frequency band without the medium access restriction in response to determining that the channel measurements satisfy the criterion, the plurality of spatial directions including the first spatial direction.

The non-transitory computer-readable medium may also include one or more of the following features. For instance, the non-transitory computer-readable medium where the code for causing the wireless communication device to determine whether the channel measurements satisfy the criterion is further configured to determine whether each measurement determined from a set of consecutive measurement occasions of the plurality of measurement occasions satisfies the criterion. The code for causing the wireless communication device to determine whether the channel measurements satisfy the criterion is further configured to determine whether each measurement determined from the set of consecutive measurement occasions of the plurality of measurement occasions satisfies a threshold. The code for causing the wireless communication device to determine whether the channel measurements satisfy the criterion is further configured to determine whether a predetermined number of channel measurements determined from a set of measurement occasions of the plurality of measurement occasions satisfies the criterion. The medium access restriction includes a beam width threshold, and where the code for causing the wireless communication device to transmit the first communication signal is further configured to transmit the first communication signal using a transmission beam having a beam width without satisfying the beam width threshold. The medium access restriction includes a transmit power threshold, and where the code for causing the wireless communication device to transmit the first communication signal is further configured to transmit the first communication signal using a transmit power without satisfying the transmit power threshold. The medium access restriction includes a transmit power spectral density (PSD) threshold, and where the code for causing the wireless communication device to transmit the first communication signal is further configured to transmit the first communication signal having a transmit PSD without satisfying the transmit PSD threshold. The medium access restriction includes a duty cycle threshold, and where the code for causing the wireless communication device to transmit the first communication signal is further configured to transmit the first communication signal based on a duty cycle that is without satisfying the duty cycle threshold. The medium access restriction includes a listen-before-talk (LBT), and where the code for causing the wireless communication device to transmit the first communication signal is further configured to transmit the first communication signal without performing the LBT. The non-transitory computer-readable medium may further include code for causing the wireless communication device to perform second channel measurements in the shared radio frequency band during a second plurality of measurement occasions spaced apart in time, the second channel measurements being based on the plurality of spatial directions; and code for causing the wireless communication device to transmit, in a second spatial direction, a second communication signal in the shared radio frequency band with the medium access restriction in response to a determination that the second channel measurements fail to satisfy the criterion for accessing the shared radio frequency band without the medium access restriction. The code for causing the wireless communication device to transmit the second communication signal is further configured to transmit the second communication signal using a transmission beam having a beam width satisfying a beam width threshold based on the medium access restriction. The code for causing the wireless communication device to transmit the second communication signal is further configured to transmit the second commu-nication signal using a transmit power satisfying a transmit power threshold based on the medium access restriction. The code for causing the wireless communication device to transmit the second communication signal is further configured to transmit the second communication signal having a transmit power spectral density (PSD) satisfying a transmit PSD threshold based on the medium access restriction. The code for causing the wireless communication device to transmit the second communication signal is further configured to transmit the second communication signal based on a duty cycle satisfying a duty cycle threshold based on the medium access restriction. The non-transitory computer-readable medium may further include code for causing the wireless communication device to perform a listen-before-talk (LBT) procedure before transmitting the second communication signal based on the medium access restriction. The shared radio frequency band is a millimeter wave (mmWav) unlicensed band.

Further aspects of the present disclosure include a wireless communication device. The wireless communication device includes means for perform channel measurements in a shared radio frequency band during a plurality of measurement occasions spaced apart in time, the channel measurements being based on a plurality of spatial directions. The device also includes means for determining whether the channel measurements satisfy a criterion for accessing the shared radio frequency band without a medium access restriction. The device also includes means for transmitting, in a first spatial direction, a first communication signal in the shared radio frequency band without the medium access restriction in response to determining that the channel measurements satisfy the criterion, the plurality of spatial directions including the first spatial direction.

The wireless communication device may also include one or more of the following features. For instance, the wireless communication device may include where the means for determining whether the channel measurements satisfy the criterion is further configured to determine whether each measurement determined from a set of consecutive measurement occasions of the plurality of measurement occasions satisfies the criterion. The means for determining whether the channel measurements satisfy the criterion is further configured to determine whether each measurement determined from the set of consecutive measurement occasions of the plurality of measurement occasions satisfies a threshold. The means for determining whether the channel measurements satisfy the criterion is further configured to determine whether a predetermined number of channel measurements determined from a set of measurement occasions of the plurality of measurement occasions satisfies the criterion. The medium access restriction includes a beam width threshold, and where the means for transmitting the first communication signal is further configured to transmit the first communication signal using a transmission beam having a beam width without satisfying the beam width threshold. The medium access restriction includes a transmit power threshold, and where the means for transmitting the first communication signal is further configured to transmit the first communication signal using a transmit power without satisfying the transmit power threshold. The medium access restriction includes a transmit power spectral density (PSD) threshold, and where the means for transmitting the first communication signal is further configured to transmit the first communication signal having a transmit PSD without satisfying the transmit PSD threshold. The medium access restriction includes a duty cycle threshold, and where the means for transmitting the first communication signal is further configured to transmit the first communication signal based on a duty cycle that is without satisfying the duty cycle threshold. The medium access restriction includes a listen-before-talk (LBT), and where the means for transmitting the first communication signal is further configured to transmit the first communication signal without performing the LBT. The wireless communication device may further include means for performing second channel measurements in the shared radio frequency band during a second plurality of measurement occasions spaced apart in time, the second channel measurements being based on the plurality of spatial directions; and means for transmitting, in a second spatial direction, a second communication signal in the shared radio frequency band with the medium access restriction in response to a determination that the second channel measurements fail to satisfy the criterion for accessing the shared radio frequency band without the medium access restriction. The means for transmitting the second communication signal is further configured to transmit the second communication signal using a transmission beam having a beam width satisfying a beam width threshold based on the medium access restriction. The means for transmitting the second communication signal is further configured to transmit the second communication signal using a transmit power satisfying a transmit power threshold based on the medium access restriction. The means for transmitting the second communication signal is further configured to transmit the second communication signal having a transmit power spectral density (PSD) satisfying a transmit PSD threshold based on the medium access restriction. The means for transmitting the second communication signal is further configured to transmit the second communication signal based on a duty cycle satisfying a duty cycle threshold based on the medium access restriction. The wireless communication device may further include means for performing a listen-before-talk (LBT) procedure before transmitting the second communication signal based on the medium access restriction. The shared radio frequency band is a millimeter wave (mmWav) unlicensed band.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   performing, by a wireless communication device, channel measurements in a shared radio frequency band during a plurality of measurement occasions spaced apart in time, the performing the channel measurements being based on a plurality of spatial directions;
   determining, by the wireless communication device, whether the channel measurements satisfy a criterion for accessing the shared radio frequency band without a medium access restriction;
   transmitting, by the wireless communication device in a first spatial direction, a first communication signal in the shared radio frequency band without the medium access restriction in response to determining that the channel measurements satisfy the criterion, the plurality of spatial directions including the first spatial direction;
   performing, by the wireless communication device, second channel measurements in the shared radio frequency band during a second plurality of measurement occasions spaced apart in time, the performing the second channel measurements being based on the plurality of spatial directions; and
   transmitting, by the wireless communication device in a second spatial direction, a second communication signal in the shared radio frequency band with the medium access restriction in response to a determination that the second channel measurements fail to satisfy the criterion for accessing the shared radio frequency band without the medium access restriction.

2. The method of claim 1, wherein the determining whether the channel measurements satisfy the criterion comprises:
   determining whether each measurement determined from a set of consecutive measurement occasions of the plurality of measurement occasions satisfies the criterion.

3. The method of claim 2, wherein the determining whether the channel measurements satisfy the criterion comprises:

determining whether each measurement determined from the set of consecutive measurement occasions of the plurality of measurement occasions satisfies a threshold.

4. The method of claim 1, wherein the determining whether the channel measurements satisfy the criterion comprises:
determining whether a predetermined number of channel measurements determined from a set of measurement occasions of the plurality of measurement occasions satisfies the criterion.

5. The method of claim 1, wherein the medium access restriction includes a beam width threshold, and wherein the transmitting the first communication signal comprises:
transmitting, by the wireless communication device, the first communication signal using a transmission beam having a beam width without satisfying the beam width threshold.

6. The method of claim 1, wherein the medium access restriction includes a transmit power threshold, and wherein the transmitting the first communication signal comprises:
transmitting, by the wireless communication device, the first communication signal using a transmit power without satisfying the transmit power threshold.

7. The method of claim 1, wherein the medium access restriction includes a transmit power spectral density (PSD) threshold, and wherein the transmitting the first communication signal comprises:
transmitting, by the wireless communication device, the first communication signal having a transmit PSD without satisfying the transmit PSD threshold.

8. The method of claim 1, wherein the medium access restriction includes a duty cycle threshold, and wherein the transmitting the first communication signal comprises:
transmitting, by the wireless communication device, the first communication signal based on a duty cycle that is without satisfying the duty cycle threshold.

9. The method of claim 1, wherein the medium access restriction includes a listen-before-talk (LBT), and wherein the transmitting the first communication signal comprises:
transmitting the first communication signal without performing the LBT.

10. The method of claim 1, wherein the transmitting the second communication signal comprises:
transmitting, by the wireless communication device, the second communication signal using a transmission beam having a beam width satisfying a beam width threshold based on the medium access restriction.

11. The method of claim 1, wherein the transmitting the second communication signal comprises:
transmitting, by the wireless communication device, the second communication signal using a transmit power satisfying a transmit power threshold based on the medium access restriction.

12. The method of claim 1, wherein the transmitting the second communication signal comprises:
transmitting, by the wireless communication device, the second communication signal having a transmit power spectral density (PSD) satisfying a transmit PSD threshold based on the medium access restriction.

13. The method of claim 1, wherein the transmitting the second communication signal comprises:
transmitting, by the wireless communication device, the second communication signal based on a duty cycle satisfying a duty cycle threshold based on the medium access restriction.

14. The method of claim 1, wherein the transmitting the second communication signal comprises:
performing, by the wireless communication device, a listen-before-talk (LBT) procedure before transmitting the second communication signal based on the medium access restriction.

15. A wireless communication device comprising:
a processor configured to:
perform channel measurements in a shared radio frequency band during a plurality of measurement occasions spaced apart in time, the channel measurements being based on a plurality of spatial directions; and
determine whether the channel measurements satisfy a criterion for accessing the shared radio frequency band without a medium access restriction; and
a transceiver coupled to the processor, wherein the transceiver is configured to:
transmit, in a first spatial direction, a first communication signal in the shared radio frequency band without the medium access restriction in response to determining that the channel measurements satisfy the criterion, the plurality of spatial directions including the first spatial direction;
perform second channel measurements in the shared radio frequency band during a second plurality of measurement occasions spaced apart in time, the second channel measurements being based on the plurality of spatial directions; and
transmit, in a second spatial direction, a second communication signal in the shared radio frequency band with the medium access restriction in response to a determination that the second channel measurements fail to satisfy the criterion for accessing the shared radio frequency band without the medium access restriction.

16. The wireless communication device of claim 15, wherein the processor configured to determine whether the channel measurements satisfy the criterion is further configured to:
determine whether each measurement determined from a set of consecutive measurement occasions of the plurality of measurement occasions satisfies the criterion.

17. The wireless communication device of claim 15, wherein the processor configured to determine whether the channel measurements satisfy the criterion is further configured to:
determine whether a predetermined number of channel measurements determined from a set of measurement occasions of the plurality of measurement occasions satisfies the criterion.

18. The wireless communication device of claim 15, wherein the medium access restriction includes at least one of a beam width threshold, a transmit power threshold, a transmit power spectral density (PSD) threshold, or a duty cycle threshold, and wherein the transceiver configured to transmit the first communication signal is further configured to:
transmit the first communication signal based on at least one of:
a transmission beam having a beam width that does not satisfy the beam width threshold;
a transmit power that does not satisfy the transmit power threshold;
a transmit PSD that does not satisfy the transmit PSD threshold; or a duty cycle that does not satisfy the duty cycle threshold.

19. The wireless communication device of claim 15, wherein the medium access restriction includes a listen-before-talk (LBT), and wherein the transceiver configured to transmit the first communication signal is further configured to:
transmit the first communication signal without performing the LBT.

20. The wireless communication device of claim 15, wherein the transceiver configured to transmit the second communication signal is further configured to:
transmit the second communication signal based on at least one of:
a transmission beam having a beam width that satisfies a beam width threshold associated with the medium access restriction;
a transmit power that satisfies a transmit power threshold associated with the medium access restriction;
a transmit power spectral density (PSD) that satisfies a transmit PSD threshold associated with the medium access restriction; or,
a duty cycle that satisfies a duty cycle threshold associated with the medium access restriction.

21. The wireless communication device of claim 15, wherein the processor is further configured to:
perform a listen-before-talk (LBT) procedure before the second communication signal based on the medium access restriction.

22. A non-transitory computer-readable medium having program code recorded thereon, the program code comprising:
code for causing a wireless communication device to perform channel measurements in a shared radio frequency band during a plurality of measurement occasions spaced apart in time, the channel measurements being based on a plurality of spatial directions;
code for causing the wireless communication device to determine whether the channel measurements satisfy a criterion for accessing the shared radio frequency band without a medium access restriction; and
code for causing the wireless communication device to transmit, in a first spatial direction, a first communication signal in the shared radio frequency band without the medium access restriction in response to determining that the channel measurements satisfy the criterion, the plurality of spatial directions including the first spatial direction
code for causing the wireless communication device to perform second channel measurements in the shared radio frequency band during a second plurality of measurement occasions spaced apart in time, the second channel measurements being based on the plurality of spatial directions; and
code for causing the wireless communication device to transmit, in a second spatial direction, a second communication signal in the shared radio frequency band with the medium access restriction in response to a determination that the second channel measurements fail to satisfy the criterion for accessing the shared radio frequency band without the medium access restriction.

23. The non-transitory computer-readable medium of claim 22, wherein the code for causing the wireless communication device to determine whether the channel measurements satisfy the criterion is further configured to:
determine whether each measurement determined from a set of consecutive measurement occasions of the plurality of measurement occasions satisfies the criterion.

24. The non-transitory computer-readable medium of claim 22, wherein the code for causing the wireless communication device to determine whether the channel measurements satisfy the criterion is further configured to:
determine whether a predetermined number of channel measurements determined from a set of measurement occasions of the plurality of measurement occasions satisfies the criterion.

25. The non-transitory computer-readable medium of claim 22, wherein the medium access restriction includes at least one of a beam width threshold, a transmit power threshold, a transmit power spectral density (PSD) threshold, or a duty cycle threshold, and wherein the code for causing the wireless communication device to transmit the first communication signal is further configured to:
transmit the first communication signal based on at least one of:
a transmission beam having a beam width that does not satisfy the beam width threshold;
a transmit power that does not satisfy the transmit power threshold;
a transmit PSD that does not satisfy the transmit PSD threshold; or
a duty cycle that does not satisfy the duty cycle threshold.

26. A wireless communication device comprising:
means for perform channel measurements in a shared radio frequency band during a plurality of measurement occasions spaced apart in time, the channel measurements being based on a plurality of spatial directions;
means for determining whether the channel measurements satisfy a criterion for accessing the shared radio frequency band without a medium access restriction;
means for transmitting, in a first spatial direction, a first communication signal in the shared radio frequency band without the medium access restriction in response to determining that the channel measurements satisfy the criterion, the plurality of spatial directions including the first spatial direction;
means for performing, by the wireless communication device, second channel measurements in the shared radio frequency band during a second plurality of measurement occasions spaced apart in time, the performing the second channel measurements being based on the plurality of spatial directions; and
means for transmitting, by the wireless communication device in a second spatial direction, a second communication signal in the shared radio frequency band with the medium access restriction in response to a determination that the second channel measurements fail to satisfy the criterion for accessing the shared radio frequency band without the medium access restriction.

27. The wireless communication device of claim 26, wherein the means for determining whether the channel measurements satisfy the criterion is further configured to:
determine whether each measurement determined from a set of consecutive measurement occasions of the plurality of measurement occasions satisfies the criterion.

28. The wireless communication device of claim 26, wherein the medium access restriction includes at least one of a beam width threshold, a transmit power threshold, a transmit power spectral density (PSD) threshold, or a duty cycle threshold, and wherein the means for transmitting the first communication signal is further configured to:

transmit the first communication signal based on at least one of:
  a transmission beam having a beam width that does not satisfy the beam width threshold;
  a transmit power that does not satisfy the transmit power threshold;
  a transmit PSD that does not satisfy the transmit PSD threshold; or
a duty cycle that does not satisfy the duty cycle threshold.

* * * * *